H. H. DAY & R. McMULLEN.
INDIA RUBBER HOSE.
No. 7,650. Patented Sept. 17, 1850.
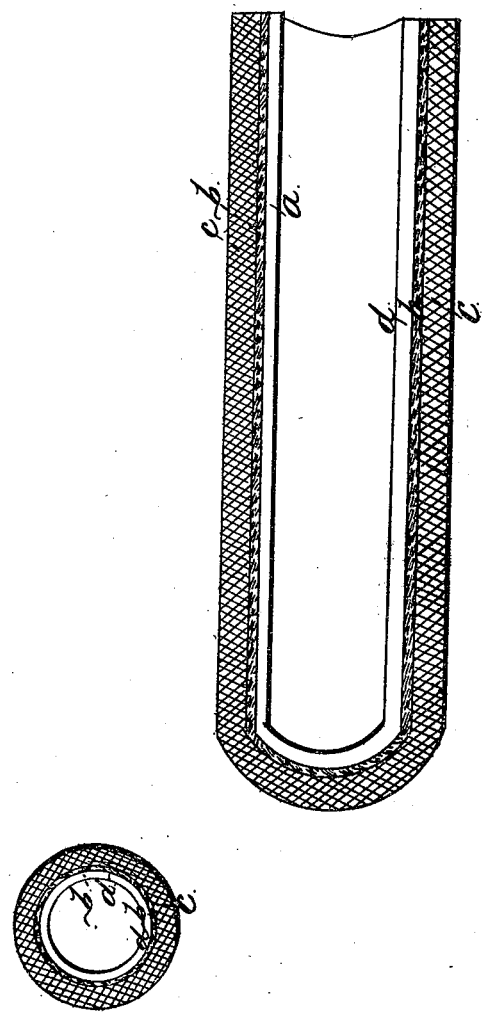

UNITED STATES PATENT OFFICE.

H. H. DAY AND R. McMULLEN, OF GREAT BARRINGTON, MASSACHUSETTS.

INDIA RUBBER HOSE.

Specification of Letters Patent No. 7,650, dated September 17, 1850.

*To all whom it may concern:*

Be it known that we, HORACE H. DAY, of Jersey City, in the county of Hudson and State of New Jersey, and RICHARD McMULLEN, of Great Barrington, in the county of Berkshire, in the State of Massachusetts, have invented a new and Improved Manner of Making Hose for Conducting Fluids; and we hereby declare that the following is a full and exact description of the same.

The nature of our invention consists in forming water tight, and durable hose from india rubber, and fibrous substance so arranged as to impart strength and yet prevent mildew to the fibrous substance which is the source of decay to other kinds of rubber hose.

To enable others skilled in the art of making india rubber, to make and use our invention and to explain its advantages and difference from all other hose before known, we first premise the hose is to be made from what is known as valcanized rubber, the various processes for making which are well known.

We first form a tube (*a*) of rubber, say one twentieth of an inch thick, more or less according to the size of hose to be made; outside of this and in immediate contact with it is to be placed one or more ply of cloth (*b*); that which we find best is open, loose duck of cotton material. This cloth is to be first coated on both sides with a thin solution of rubber, so as to fill up the interstices and render the surface tacky or adhesive. Outside of this is to be placed: one, two, or more laminæ of rubber (*c*) prepared with fibers of cotton or other suitable vegetable matter, as hereinafter described, allowing the whole to be firmly united and rolled in the usual way; when the whole is ready for vulcanizing according to any of the well known processes. The article used to make this outside or principal part of the hose is rubber and fibers of cotton.

The best way known to us to prepare the outside, which for want of a name, we will call, india rubber leather (*c*), is to take five parts by weight of rubber cloth cuttings, these cuttings, are the refuse or chips usually made in cutting clothing, shoes, and other similar goods, and being part cloth and part rubber, to this add six parts by weight of rubber compound as prepared for spreading, the whole are then ground together in the grinding mill until they are thoroughly incorporated, and the mill to accomplish this must be so constructed that one roller revolves much faster than the other and the grinding continues until all appearance of pieces of cloth is removed, it is then while in the heated state ready to pass into the callenders for rolling into sheets. We find sheets of rubber prepared in this way loses nearly all its stretching quality and is sufficiently strong to answer the purpose of making hose.

In the forming of our improved hose pipe we sometimes leave out the second laminæ or open cloth, using only the lining or tube combined with the several plies of india rubber leather, but in this case the india rubber leather which is to form the strength or lateral support should be cut crosswise of the piece, say two ply cut crosswise of the piece, and the outside or last laminæ may be cut lengthwise to produce a uniform appearance to the surface. By these arrangements we produce a hose which will bend without forming sharp corners when rolled or folded up, which is the cause of wearing out in places in other hose, and avoid a still greater objection, the wetting of the fiber quite through the hose which is the cause of bursting in hose made in the usual methods of alternate layings of rubber, and cloth, for by such method if one thread of cloth becomes wet with water, the humidity is imparted to other threads until the whole thickness becomes wet, mildewed and rotten.

We know that hose has been made by covering a tube of rubber with several layers of cloth coated upon both sides with rubber. To this we make no claim. We do not claim the grinding together of india rubber in the plastic state with fibrous material generally, as that has been already done.

What we do claim as our invention, and desire to secure by Letters Patent, is—

The making of flexible hose or pipe, by combining india rubber leather with a tube of rubber, substantially as herein described, the whole being united, forming one solid tube, making a strong, durable, and flexible hose, adapted as a substitute for leather and other similar pipes for the conveying of fluids.

HORACE H. DAY.
RICHARD McMULLEN.

Witnesses as to H. H. Day:
D. WYCKOFF,
WM. H. ROGERS.

Witnesses as to R. McMullen:
SAML. B. LUMM,
J. SUMNER.